US010458159B2

(12) United States Patent
Otani et al.

(10) Patent No.: US 10,458,159 B2
(45) Date of Patent: Oct. 29, 2019

(54) VEHICLE BODY FRONT STRUCTURE

(71) Applicant: HONDA MOTOR CO., LTD., Tokyo (JP)

(72) Inventors: Yui Otani, Wako (JP); Masaki Izutsu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/989,470

(22) Filed: May 25, 2018

(65) Prior Publication Data

US 2018/0347238 A1    Dec. 6, 2018

(30) Foreign Application Priority Data

May 30, 2017   (JP) ................... 2017-106802

(51) Int. Cl.
| | |
|---|---|
| *E05B 83/00* | (2014.01) |
| *E05B 83/24* | (2014.01) |
| *E05B 77/04* | (2014.01) |
| *B60R 19/18* | (2006.01) |
| *B60R 19/02* | (2006.01) |
| *B60R 19/48* | (2006.01) |
| *E05B 77/00* | (2014.01) |

(52) U.S. Cl.
CPC ............ *E05B 83/24* (2013.01); *B60R 19/023* (2013.01); *B60R 19/18* (2013.01); *B60R 19/48* (2013.01); *E05B 77/04* (2013.01); *B60R 2019/1806* (2013.01)

(58) Field of Classification Search
CPC ......... E05B 83/24; E05B 77/04; B60R 19/48; B62D 25/08; B62D 25/085

USPC ............ 296/193.08, 193.11, 203.01, 203.02; 293/117, 144, 102; 180/69.2, 69.21
See application file for complete search history.

(56) References Cited

U.S. PATENT DOCUMENTS

| | | | | |
|---|---|---|---|---|
| 2005/0253419 | A1* | 11/2005 | Kwon ................. | B62D 25/084 296/193.09 |
| 2011/0037292 | A1* | 2/2011 | Owen .................. | B62D 25/084 296/193.09 |

(Continued)

FOREIGN PATENT DOCUMENTS

| | | | |
|---|---|---|---|
| DE | 102008018316 | * 10/2009 | ........... B62D 25/084 |
| JP | 2011-121437 A | 6/2011 | |
| JP | 2011-173565 A | 9/2011 | |

(Continued)

OTHER PUBLICATIONS

Japanese Office Action (w/ partial English translation) issued for Application No. 2017-106802 dated Oct. 12, 2018.

*Primary Examiner* — Dennis H Pedder
(74) *Attorney, Agent, or Firm* — Thomas | Horstemeyer, LLP

(57) ABSTRACT

A vehicle body front structure comprises a bumper beam provided in a front portion of a vehicle body, a hood lock member provided on a rear side and an upper side of the bumper beam, and a hood lock provided on an upper side of the hood lock member and configured to engage with a hood so that the hood can be opened/closed. The hood lock member is made of a resin. A hood lock bracket made of a metal is attached to the hood lock member. The hood lock is attached to the hood lock bracket. The hood lock bracket and the bumper beam are connected by a connecting member.

6 Claims, 5 Drawing Sheets

(56) References Cited

U.S. PATENT DOCUMENTS

2016/0137230 A1    5/2016  Taneda
2017/0232917 A1*   8/2017  Nakayama .............. B60R 19/04
                                                            293/102

FOREIGN PATENT DOCUMENTS

| JP | 2015-080968 A | 4/2015 |
| JP | 2016-094151 A | 5/2016 |
| WO | 2015/059534 A | 4/2015 |

* cited by examiner

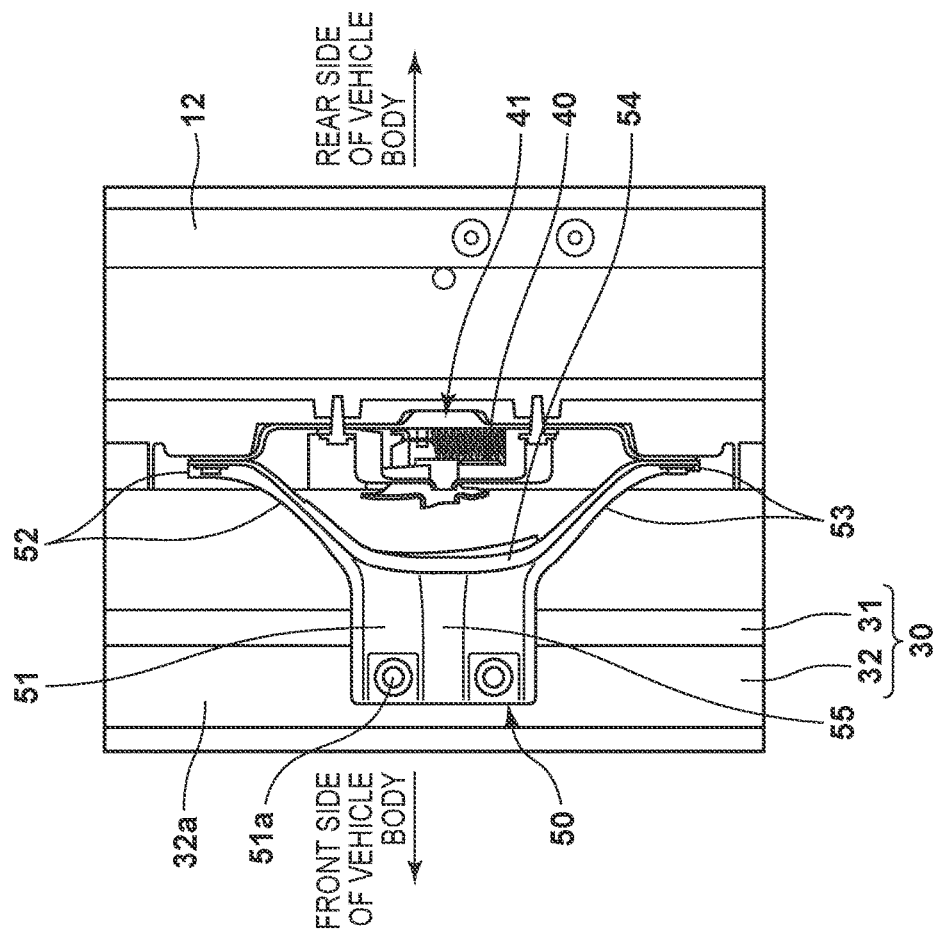
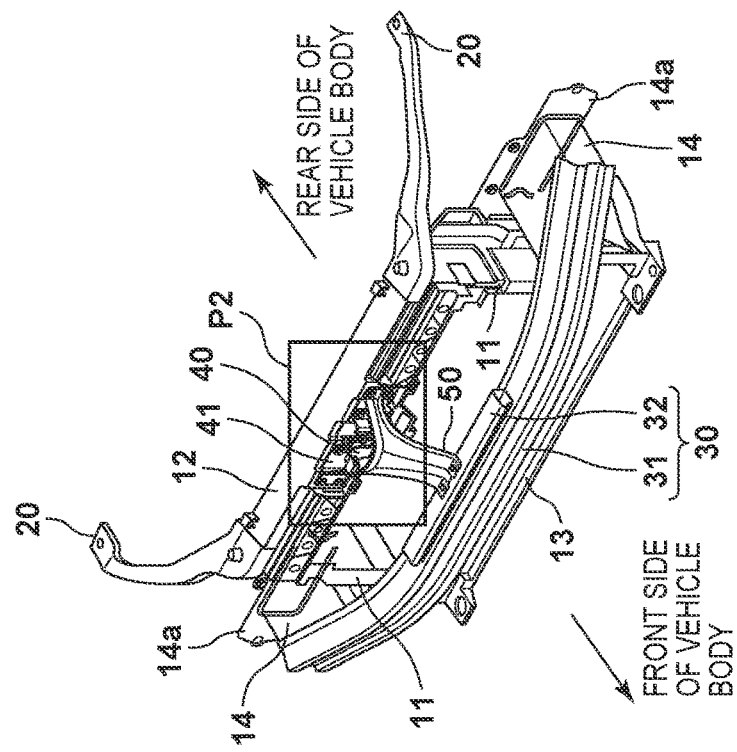

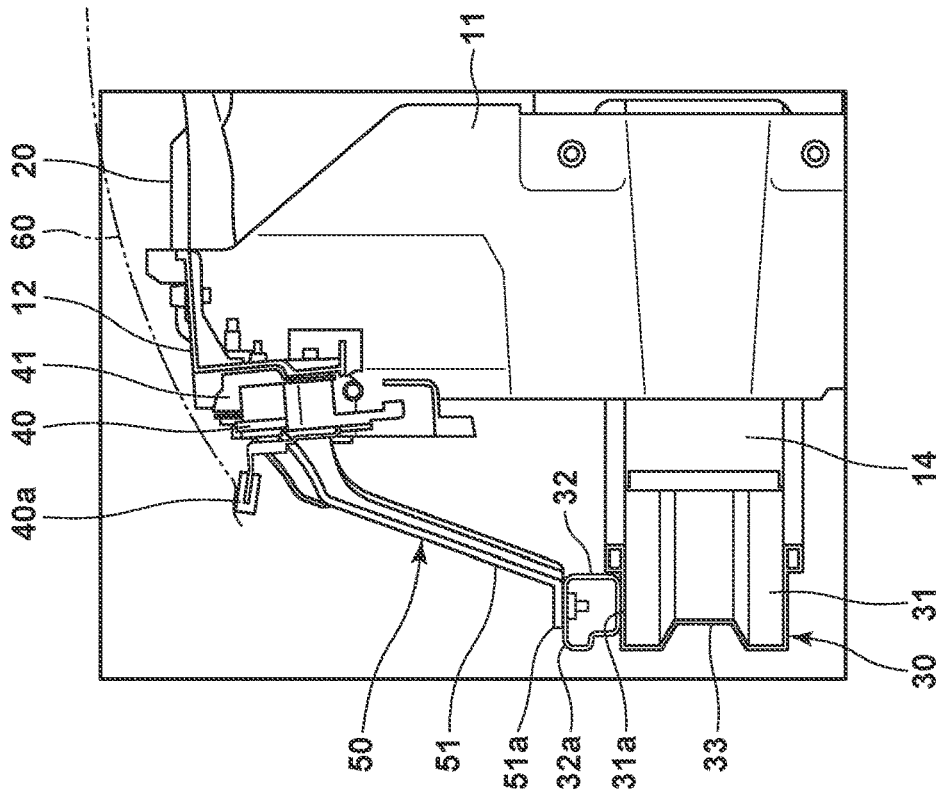
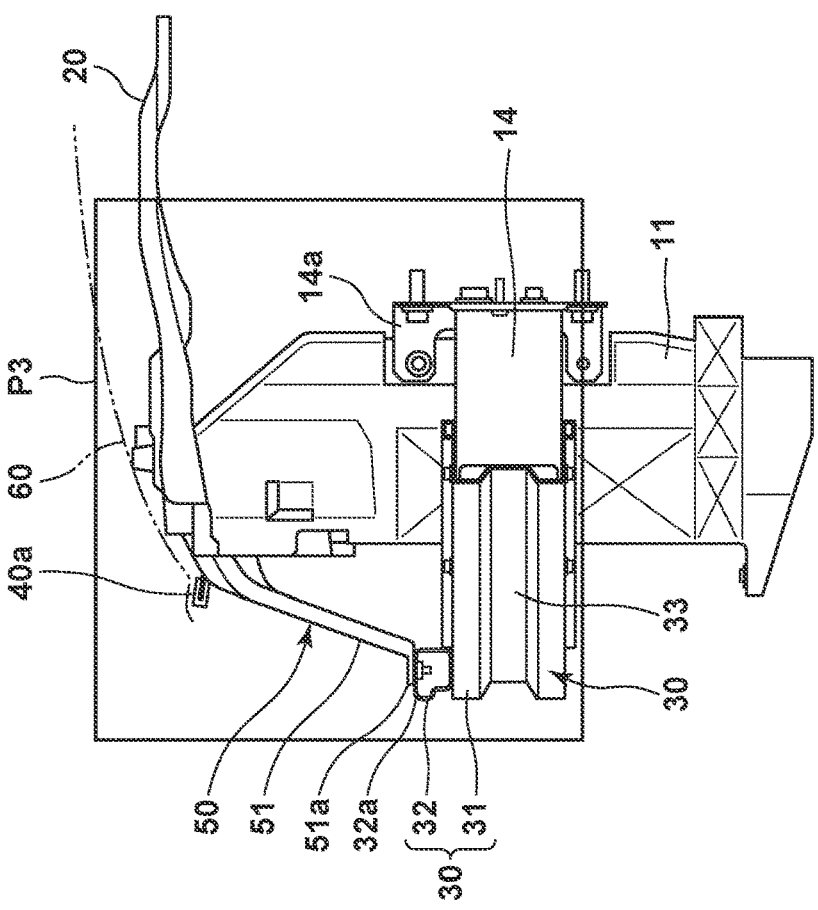

VEHICLE BODY FRONT STRUCTURE

CROSS REFERENCE TO RELATED APPLICATIONS

The present application claims the benefit of priority under 35 U.S.C. § 119 to Japanese Patent Application No. 2017-106802, filed May 30, 2017. The contents of this application are incorporated herein by reference in their entirety.

BACKGROUND OF THE INVENTION

Field of the Invention

The present invention relates to the hood lock attachment structure of a vehicle body front portion.

Description of the Related Art

Japanese Patent Laid-Open No. 2016-94151 discloses disposing a radar bracket 124 between a bumper member 120 and a hood lock member 122 and attaching a hood lock 138 between the radar bracket and the hood lock member 122.

In Japanese Patent Laid-Open No. 2016-94151, since the hood lock member 122 is made of a metal, a problem the hood lock member 122 supporting the hood lock 138 breaking due to an impact at the time of a collision or the like, and the engine hood opening is uncommon. However, when the hood lock member is made of a resin to reduce the weight, in a structure in which the hood lock is directly attached to the hood lock member made of the resin, the hood lock member may break due to an impact at the time of a collision or the like, and the hood may open.

SUMMARY OF THE INVENTION

The present invention has been made in consideration of the aforementioned problems, and realizes a vehicle body front structure capable of preventing a hood lock member from breaking due to an impact at the time of a collision and opening an engine hood.

In order to solve the aforementioned problems, the first aspect of the present invention provides a vehicle body front structure comprising: a bumper beam provided in a front portion of a vehicle body; a hood lock member provided on a rear side and an upper side of the bumper beam; and a hood lock provided on an upper side of the hood lock member and configured to engage with a hood so that the hood can be opened/closed; wherein the hood lock member is made of a resin, a hood lock bracket made of a metal is attached to the hood lock member, the hood lock is attached to the hood lock bracket, and the hood lock bracket and the bumper beam are connected by a connecting member.

According to the present invention, it is possible to prevent the hood lock member from breaking due to an impact at the time of a collision and opening the engine hood.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2A is a perspective view of the vehicle body front structure according to the present embodiment;

FIG. 2B is an enlarged plan view of a portion P2 in FIG. 2A;

FIG. 5A is a side view viewed from the left side in the vehicle width direction in FIG. 1; and FIG. 5B is a side sectional view of a portion P3 in FIG. 5A cut at the central portion in the vehicle width direction.

DESCRIPTION OF THE EMBODIMENTS

The present embodiment of the present invention will now be described in detail with reference to the accompanying drawings.

<Overall Structure>

Figure 1:
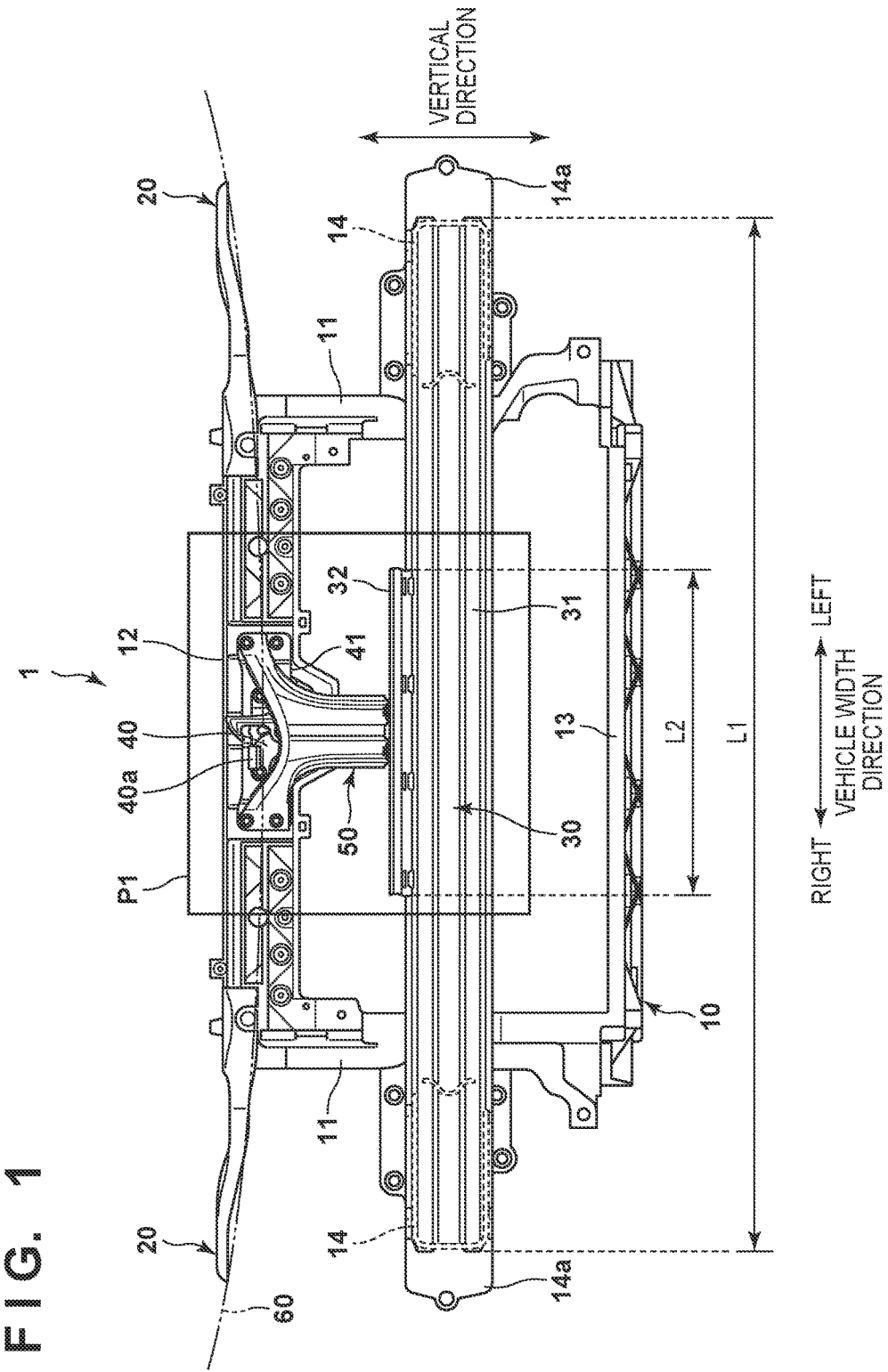
FIG. 1 is a front view showing a vehicle body front structure according to the present embodiment.

The overall structure of a vehicle body front structure according to the present embodiment will schematically be described first with reference to FIG. 1. FIG. 1 is a front view of the vehicle body front structure visible from the vehicle body front portion when a front bumper and a front grille are detached from the vehicle body front portion.

As shown in FIG. 1, a vehicle body front structure 1 according to the present embodiment includes a radiator support 10 having a rectangular frame shape, a pair of left and right headlight upper members 20, and a beam-shaped bumper beam 30.

The radiator support 10 is connected, by fastening members such as bolts, to the front ends of front side frames (not shown) extending in the longitudinal direction on both sides in the vehicle width direction of the vehicle body, and holds a radiator main body formed from a radiator core and a radiator shroud (neither are shown). A hood lock (also called a bonnet catcher) 40 that engages with an anchor portion provided at the front end of an engine hood 60 (also called a bonnet) is attached to the radiator support 10. The radiator support 10 includes side members 11, an upper member 12, and a lower member 13. The side members 11 are columnar members that form a pair of left and right side edge portions of the radiator support 10 having the rectangular frame shape and extend in the vertical direction of the vehicle body. The front ends of the front side frames (not shown) are located on the outer sides of the side members 11 in the vehicle width direction. The radiator support 10 is, for example, a molded component made of a resin material such as ABS or PP.

The upper member 12 is a beam-shaped member that forms an upper side edge portion for connecting the upper ends of the left and right side members 11 and extends in the vehicle width direction. The upper member 12 also has the function of a hood lock member that supports the hood lock 40, as will be described later. The lower member 13 is a beam-shaped member that forms a lower side edge portion for connecting the lower ends of the left and right side members 11 and extends in the vehicle width direction.

The hood lock 40 that engages with the front end of the engine hood 60 is attached to the central portion of the upper member 12 in the vehicle width direction by fastening members such as bolts via a hood lock bracket 41 to be described later. The rear end of the engine hood (to be abbreviated as a hood hereinafter) 60 is axially supported on the vehicle body by a hinge or the like so that the engine room can be opened/closed. The engine hood 60 can be opened by canceling its engaging state by an operation on a lever 40a of the hood lock 40.

The pair of left and right headlight upper members 20 are attached to the left and right ends (the corner portions to which the left and right side members 11 and the upper member 12 are connected) of the upper member 12 of the radiator support 10 by fastening members such as bolts and extend obliquely backward to the outer side in the vehicle width direction. The rear end of each headlight upper member 20 is connected to a front upper frame (not shown). Each headlight upper member 20 holds a headlight unit (not shown).

The bumper beam 30 is a beam-shaped member arranged on the front side of the radiator support 10 and extending in the vehicle width direction. The bumper beam 30 is arranged in the vicinity of the central portions of the left and right side members 11 of the radiator support 10 in the vertical direction so as to face the portions. The bumper beam 30 extends in the vehicle width direction to the outer sides with respect to the left and right side members 11 of the radiator support 10. The rear surface portions of the left and right ends of the bumper beam 30 are connected to the front ends of the front side frames (not shown) via flanges 14a of load transmission members 14 by fastening members such as bolts. The bumper beam 30 has a function of transmitting an impact load at the time of a collision to the front side frames via the load transmission members 14. The bumper beam 30 has a shape curved toward the rear side of the vehicle body from the central portion of the vehicle body to both end portions thereof, and is formed by press-forming a metal material.

In addition, the bumper beam 30 and the upper member 12 of the radiator support 10 are connected by a connecting member 50 to be described later at the central portion in the vehicle width direction.

<Attachment Structure of Hood Lock>

The attachment structure of the hood lock according to the present embodiment will be described next with reference to FIGS. 2A and 2B to FIGS. 5A and 5B in addition to FIG. 1.

Figure 3:
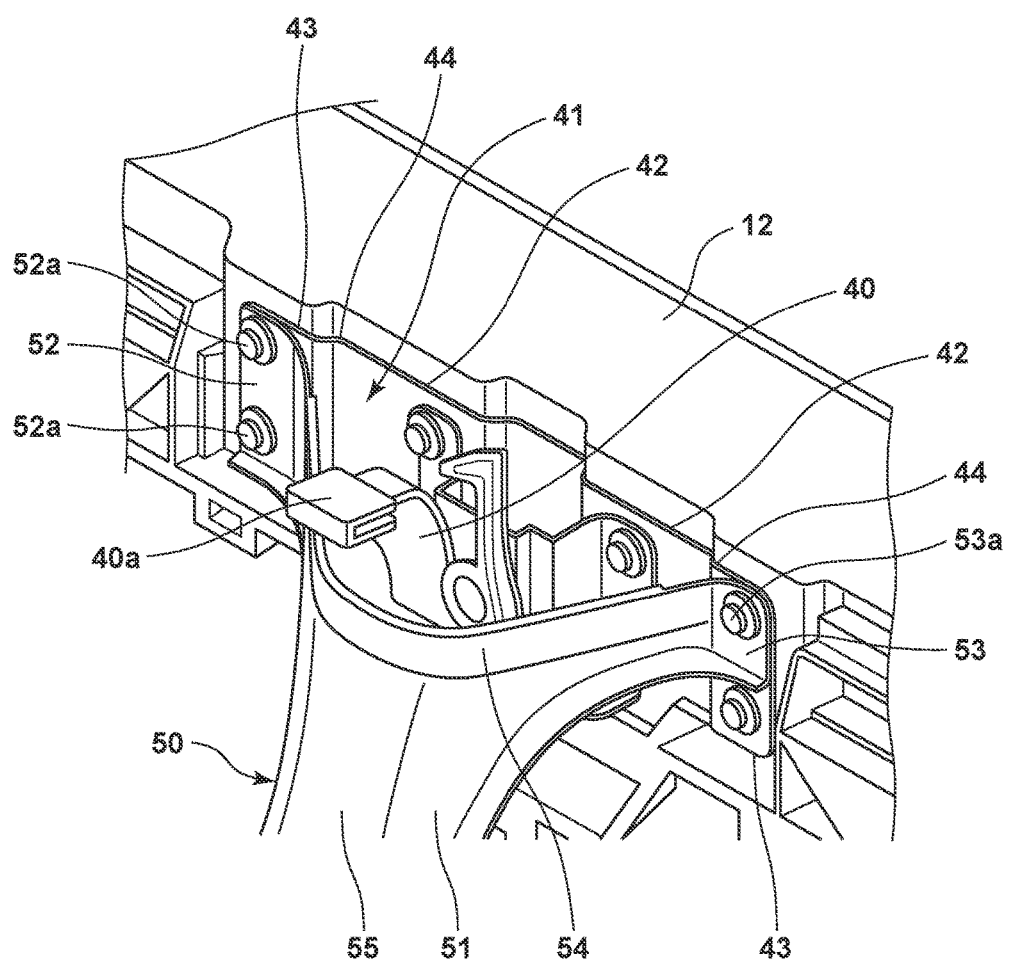
FIG. 3 is an enlarged view of the portion P2 in FIG. 2A.
Figure 4:
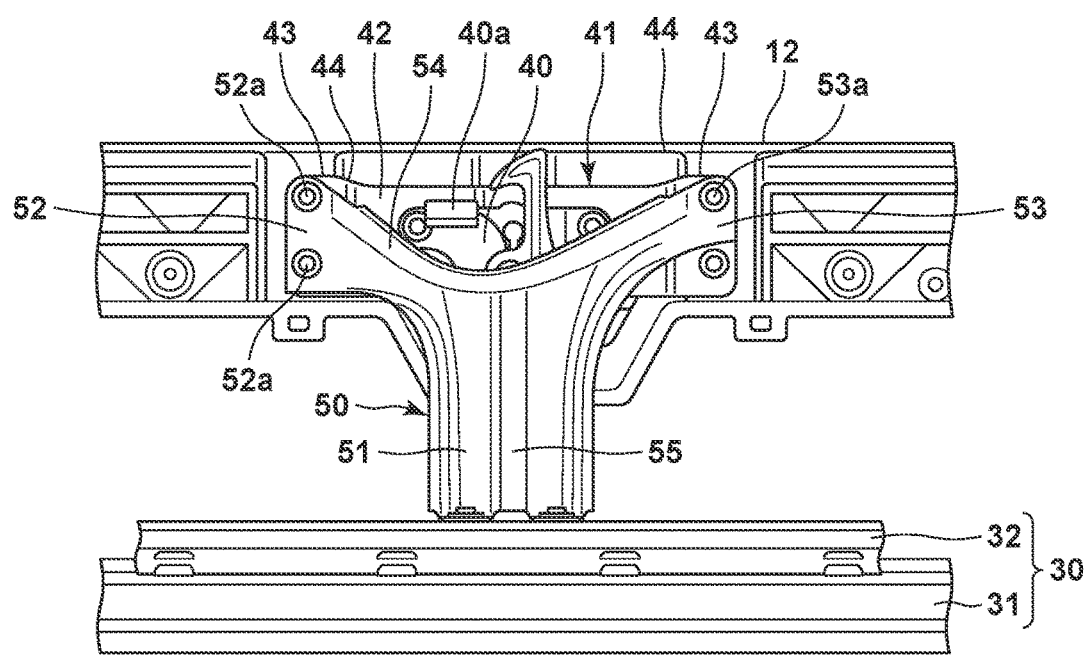
FIG. 4 is an enlarged view of a portion P1 in FIG. 1.

FIG. 2A is a perspective view of the vehicle body front structure according to the present embodiment. FIG. 2B is an enlarged plan view of a portion P2 in FIG. 2A. FIG. 3 is an enlarged view of the portion P2 in FIG. 2A. FIG. 4 is an enlarged view of a portion P1 in FIG. 1. FIG. 5A is a side view viewed from the left side in the vehicle width direction in FIG. 1. FIG. 5B is a side sectional view of a portion P3 in FIG. 5A cut at the central portion in the vehicle width direction.

The upper member 12 of the radiator support 10 has not only the function of holding the radiator main body but also the function of a hood lock member that supports the hood lock 40. A description will be made below using a term "hood lock member 12" in place of "upper member 12" of the radiator support 10.

The hood lock member 12 is provided on the rear side and the upper side of the bumper beam 30. The hood lock 40 is attached to the hood lock member 12 by fastening members such as bolts via the hood lock bracket 41 made of a metal. More specifically, the hood lock 40 is attached to the hood lock bracket 41 by fastening members such as bolts, and the hood lock bracket 41 is attached to the hood lock member 12. In addition, the hood lock bracket 41 and the bumper beam 30 are connected by the connecting member 50.

In this manner, since the hood lock 40 is attached to the hood lock bracket 41 made of a metal, and the hood lock bracket 41 is connected to the bumper beam 30 via the connecting member 50, even if the hood lock member 12 is made of a resin and the hood lock member 12 breaks due to an impact at the time of a collision or the like, the hood lock 40 can be supported by the bumper beam 30 via the hood lock bracket 41. It is therefore possible to prevent the hood lock member 12 from breaking due to an impact at the time of a collision or the like and opening the hood 60. It is also possible to improve the rigidity of the vehicle body by connecting the hood lock member 12 and the bumper beam 30 by the hood lock bracket 41.

The hood lock bracket 41 includes a lock attachment portion 42 at the central portion to which the hood lock 40 is attached and which has a shape with two ends bent, joint portions 43 at both end portions thereof located on the front side of the vehicle body with respect to the lock attachment portion 42, and front extending portions 44 bent from the lock attachment portion 42 to the front side and connected to the joint portions 43. The connecting member 50 is attached to the joint portions 43 of the hood lock bracket 41 by fastening members such as bolts.

If the hood lock 40 displaces backward via the connecting member 50 and the hood lock bracket 41 in synchronism with backward displacement of the bumper beam 30 caused by a load applied at the time of a collision (in particular, at the time of a slight collision with a small impact), the hood 60 may be deformed. In this case, exchange of the hood 60 may be needed. Considering such a situation, since joint portions 43 of the hood lock bracket 41 are arranged on the front side of the lock attachment portion 42, when the load is transmitted to the joint portions 43 via the connecting member 50, the front extending portions 44 are elastically deformed and deflected backward. This can suppress backward displacement of the lock attachment portion 42 and suppress the deformation of the hood 60.

Furthermore, the connecting member 50 includes a body portion 51 connected to the bumper beam 30 and extending upward, and a first arm portion 52 and a second arm portion 53 which branch from the body portion 51 and extend backward. The hood lock 40 is attached, in the vehicle width direction, between a first joint position 52a between the hood lock bracket 41 and the first arm portion 52 and a second joint position 53a between the hood lock bracket 41 and the second arm portion 53. The connecting member 50 is formed by press-forming a metal material.

Even if a load is input biasedly to one side of the hood 60 in the vehicle width direction at the time of a collision (if a load that lifts the hood lock 40 upward and to one side in the vehicle width direction is input), the deformation of the hood lock member 12 can be suppressed.

In addition, if a load (the weight of the hood 60 when closing the hood 60) is applied from above to the hood lock 40 (hood lock member 12) at the time of opening/closing of the hood 60, the load can be supported by the bumper beam 30 via the connecting member 50 without tilting the hood lock member 12.

Furthermore, a horizontal bead portion 54 having an uneven shape (groove shape), which is continuously curved when viewed from the front side of the vehicle body, continuously extends in vehicle width direction across the upper edge of the first arm portion 52, the upper edge of the second arm portion 53, and the upper edge of the body portion 51, and having a sectional shape projecting toward the front side of the vehicle body (recessed toward the rear side of the vehicle body) when viewed from the upside of the vehicle body is continuously formed on the connecting member 50.

Since the horizontal bead portion 54 is thus provided on the connecting member 50, the first arm portion 52 and the second arm portion 53 can be prevented from deflecting downward in a case in which the hood lock 40 (hood lock bracket 41) receives a force to displace it downward. Hence, the load (the weight of the hood 60) applied to the hood lock 40 at the time of opening/closing of the hood can be supported more reliably by the bumper beam 30 via the body portion 51.

In addition, a vertical bead portion 55 having an uneven shape (groove shape), which has a sectional shape projecting toward the front side of the vehicle body (recessed toward the rear side of the vehicle body) when viewed from the upside of the vehicle body and extends in the vertical direction from the horizontal bead portion 54 to the bumper beam 30 is continuously formed on the body portion 51 of the connecting member 50.

Since the vertical bead portion 55 is thus provided on the connecting member 50, the load (the weight of the hood 60) applied to the hood lock 40 at the time of opening/closing of the hood can more reliably be transmitted to the bumper beam 30.

In addition, since the vertical bead portion 55 is deflected by a load applied at the time of a collision (in particular, at the time of a slight collision with a small impact), the load can be reduced, and the deformation of the hood 60 can be suppressed.

The bumper beam 30 includes a beam main body 31 formed into a concave shape with an opening on the rear side of the vehicle body, and a tubular member 32 provided on an upper surface portion 31a of the beam main body 31. In the beam main body 31, a groove portion 33 having an uneven shape, which has a sectional shape recessed toward the front side of the vehicle body (projecting toward the rear side of the vehicle body) when viewed from the vehicle width direction is continuously formed in the vehicle width direction. The tubular member 32 has a closed hollow sectional shape when viewed from the vehicle width direction and is joined to the upper surface portion 31a of the beam main body 31 by a joint means such as spot welding. A lower end 51a of the body portion 51 of the connecting member 50 has a shape bent toward the front side of the vehicle body, and is attached to an upper surface portion 32a of the tubular member 32 by fastening members such as bolts.

As described above, since the bumper beam 30 is formed into a concave shape with an opening on the rear side of the vehicle body, the weight of the beam main body can be reduced while ensuring rigidity against a load from the front side of the vehicle body.

In addition, the beam main body 31 formed into a concave shape has low rigidity against a load from above. However, since the connecting member 50 is connected to the tubular member having a closed sectional shape, a load (the weight of the hood 60) applied to the hood lock 40 at the time of opening/closing of the hood can more reliably be supported by the bumper beam 30.

Furthermore, a length L2 of the tubular member 32 in the vehicle width direction is shorter than a length L1 of the beam main body 31 of the bumper beam 30 in the vehicle width direction. Additionally, the tubular member 32 is attached to the upper surface portion 31a of the beam main body 31 at the central portion in the vehicle width direction.

since the length L2 of the tubular member 32 in the vehicle width direction is made shorter than the length of the bumper beam 30, the weight can be prevented from unnecessarily increasing.

Moreover, since the tubular member 32 is attached to the upper surface portion 31a of the beam main body 31 of the bumper beam 30, a region of the bumper beam 30 where a load at the time of a collision can be input can be expanded to a position higher than the height of the beam main body 31 in the vertical direction of the vehicle body.

Summary of Embodiment

<First Aspect>

There is provide a vehicle body front structure 1 comprising:

a bumper beam 30 provided in a front portion of a vehicle body;

a hood lock member 12 provided on a rear side and an upper side of the bumper beam 30; and a hood lock 40 provided on an upper side of the hood lock 12 member and configured to engage with a hood 60 so that the hood 60 can be opened/closed;

wherein the hood lock member 12 is made of a resin, a hood lock bracket 41 made of a metal is attached to the hood lock member 12, the hood lock 40 is attached to the hood lock bracket 41, and the hood lock bracket 41 and the bumper beam 30 are connected by a connecting member 50.

According to the first aspect, since the hood lock 40 is attached to the hood lock bracket 41 made of a metal, and the hood lock bracket 41 is connected to the bumper beam 30 via the connecting member 50, even if the hood lock member 12 is made of a resin and the hood lock member 12 breaks due to an impact at the time of a collision or the like, the hood lock 40 can be supported by the bumper beam 30 via the hood lock bracket 41. It is therefore possible to prevent the hood lock member 12 from breaking due to an impact at the time of a collision or the like and opening the hood 60. It is also possible to improve the rigidity of the vehicle body by connecting the hood lock member 12 and the bumper beam 30 by the hood lock bracket 41.

<Second Aspect>

In the first aspect, the hood lock bracket 41 comprises a lock attachment portion 42 to which the hood lock 40 is attached, a joint portion 43 located on a front side of the lock attachment portion 42, and a front extending portion 44 extending frontward from the lock attachment portion 42 and connected to the joint portion 43, and the connecting member 50 is connected to the joint portion 43.

According to the second aspect, since the joint portion 43 of the hood lock bracket 41 is arranged on the front side of the lock attachment portion 42, when a load is transmitted to the joint portion 43 via the connecting member 50, the front extending portion 44 is elastically deformed and deflected backward. This can suppress backward displacement of the lock attachment portion 42 and suppress the deformation of the hood 60.

<Third Aspect>

In the first or second aspect, the connecting member 50 comprises a body portion 51 connected to the bumper beam 30, and a first arm portion 52 and a second arm portion 53 which extend backward from the body portion 51, and the hood lock 40 is attached, in a vehicle width direction, between a first joint position 52a between the hood lock bracket 41 and the first arm portion 52 and a second joint position 53a between the hood lock bracket 41 and the second arm portion 53.

According to the third aspect, even if a load is input biasedly to one side of the hood 60 in the vehicle width direction at the time of a collision (if a load that lifts the hood lock 40 upward and to one side in the vehicle width direction is input), the deformation of the hood lock member 12 can be suppressed.

In addition, if a load (the weight of the hood 60 when closing the hood 60) is applied from above to the hood lock 40 (hood lock member 12) at the time of opening/closing of the hood 60, the load can be supported by the bumper beam 30 via the connecting member 50 without tilting the hood lock member 12.

<Fourth Aspect>

In the third aspect, the connecting member 50 comprises a horizontal bead portion 54 extending in vehicle width direction across the first arm portion 52, the body portion 51, and the second arm portion 53.

According to the fourth aspect, since the horizontal bead portion 54 is provided on the connecting member 50, the first arm portion 52 and the second arm portion 53 can be prevented from deflecting downward in a case in which the hood lock 40 (hood lock bracket 41) receives a force to displace it downward. Hence, the load (the weight of the hood 60) applied to the hood lock 40 at the time of opening/closing of the hood can be supported more reliably by the bumper beam 30 via the body portion 51.

<Fifth Aspect>

In the fourth aspect, the body portion 51 comprises a vertical bead portion 55 having a convex shape toward the front side of the vehicle body and extending from the horizontal bead portion 54 to the bumper beam 30.

According to the fifth aspect, when the vertical bead portion 55 is provided on the connecting member 50, the load (the weight of the hood 60) applied to the hood lock 40 at the time of opening/closing of the hood can more reliably be transmitted to the bumper beam 30.

In addition, since the vertical bead portion 55 is deflected by a load applied at the time of a collision (in particular, at the time of a slight collision with a small impact), the load can be reduced, and the deformation of the hood 60 can be suppressed.

<Sixth Aspect>

In any one of the first to fifth aspects, the bumper beam 30 comprises a beam main body 31 formed into a concave shape with an opening on a rear side of a vehicle, and a tubular member 32 provided on an upper portion of the beam main body 31 and having a closed sectional shape, and the connecting member 50 is attached to the tubular member 32.

According to the sixth aspect, when the bumper beam 30 is formed into a concave shape with an opening on the rear side of the vehicle body, the weight of the beam main body can be reduced while ensuring rigidity against a load from the front side of the vehicle body.

In addition, the beam main body 31 formed into a concave shape has low rigidity against a load from above. However, when the connecting member 50 is connected to the tubular member having a closed sectional shape, a load (the weight of the hood 60) applied to the hood lock 40 at the time of opening/closing of the hood can more reliably be supported by the bumper beam 30.

<Seventh Aspect>

In the sixth aspect, a length L2 of the tubular member 32 in the vehicle width direction is shorter than a length L1 of the beam main body 31 in the vehicle width direction, and the tubular member 32 is attached to an upper surface portion 31a of the beam main body 31 at a central portion in the vehicle width direction.

According to the seventh aspect, when the length L2 of the tubular member 32 in the vehicle width direction is made shorter than the length of the bumper beam 30, the weight can be prevented from unnecessarily increasing.

Moreover, when the tubular member 32 is attached to the upper surface portion 31a of the beam main body 31 of the bumper beam 30, a region of the bumper beam 30 where a load at the time of a collision can be input can be expanded to a position higher than the height of the beam main body 31 in the vertical direction of the vehicle body.

The present invention is not limited to the above embodiments and various changes and modifications can be made within the spirit and scope of the present invention. Therefore, to apprise the public of the scope of the present invention the following claims are made.

What is claimed is:

1. A vehicle body front structure comprising:
    a bumper beam provided in a front portion of a vehicle body;
    a hood lock member provided on a rear side and an upper side of the bumper beam; and
    a hood lock provided on an upper side of the hood lock member and configured to engage with a hood so that the hood can be opened/closed;
    wherein the hood lock member is made of a resin,
    a hood lock bracket made of a metal is attached to the hood lock member,
    the hood lock is attached to the hood lock bracket, and
    the hood lock bracket and the bumper beam are connected by a connecting member,
    wherein the hood lock bracket comprises a lock attachment portion to which the hood lock is attached, a joint portion located on a front side of the lock attachment portion, and a front extending portion extending frontward from the lock attachment portion and connected to the joint portion, and
    the connecting member is connected to the joint portion.

2. The structure according to claim 1, wherein the connecting member comprises a body portion connected to the bumper beam, and a first arm portion and a second arm portion which extend backward from the body portion, and
    the hood lock is attached, in a vehicle width direction, between a first joint position between the hood lock bracket and the first arm portion and a second joint position between the hood lock bracket and the second arm portion.

3. The structure according to claim 2, wherein the connecting member comprises a horizontal bead portion extending in vehicle width direction across the first arm portion, the body portion, and the second arm portion.

4. The structure according to claim 3, wherein the body portion comprises a vertical bead portion having a convex shape to the front side of the vehicle body and extending from the horizontal bead portion to the bumper beam.

5. The structure according to claim 1, wherein the bumper beam comprises a beam main body formed into a concave shape with an opening on a rear side of a vehicle, and a tubular member provided on an upper portion of the beam main body and having a closed sectional shape, and
    the connecting member is attached to the tubular member.

6. The structure according to claim 5, wherein a length of the tubular member in the vehicle width direction is shorter than a length of the beam main body in the vehicle width direction, and the tubular member is attached to an upper surface portion of the beam main body at a central portion in the vehicle width direction.

\* \* \* \* \*